Aug. 22, 1950   R. SIMPSON   2,520,069
MIXING VALVE
Filed Nov. 20, 1946
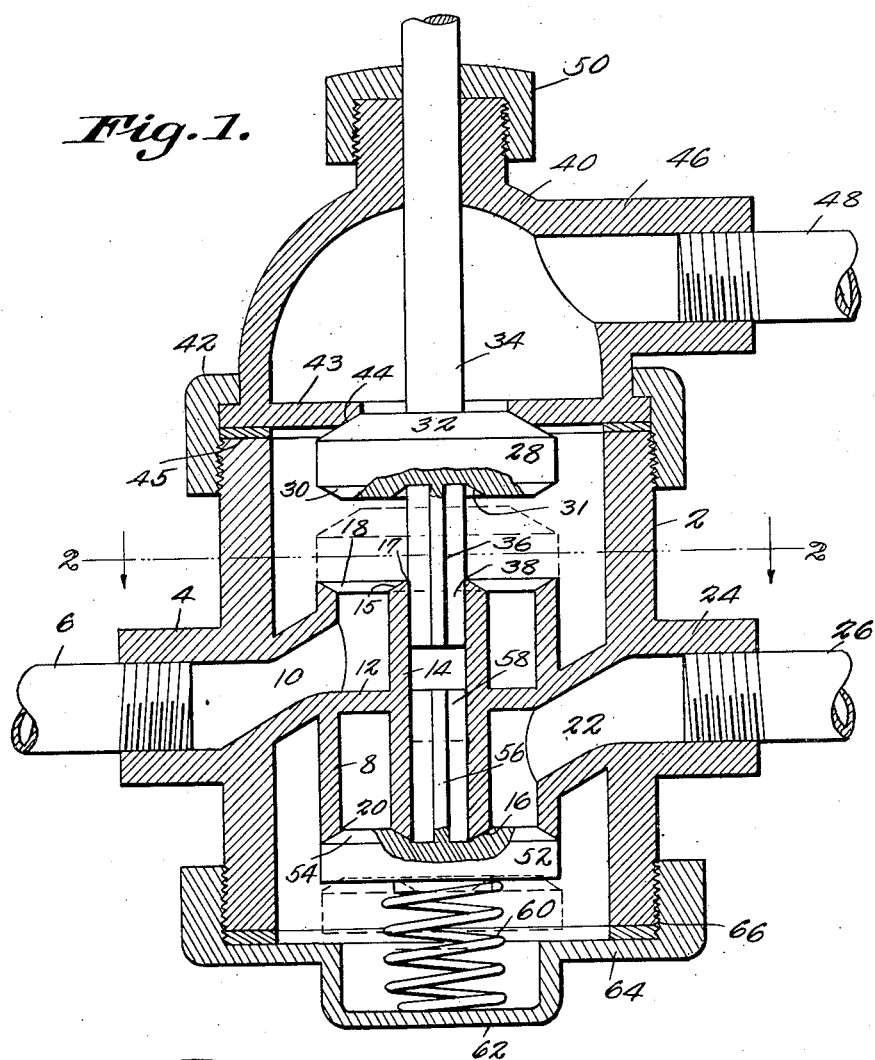
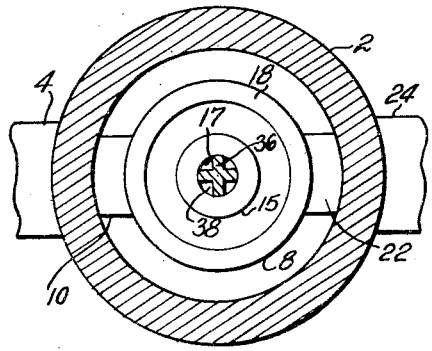
Robert Simpson
INVENTOR
BY *Knowles*
ATTORNEYS.

Patented Aug. 22, 1950

2,520,069

UNITED STATES PATENT OFFICE 2,520,069

MIXING VALVE

Robert Simpson, Los Angeles, Calif.

Application November 20, 1946, Serial No. 711,030

2 Claims. (Cl. 277—8)

1

My present invention relates to an improved mixing valve of the type designed to mix two liquids or fluids in selected ratio. The valve may well be employed for mixing hot and cold water, air of varying temperatures, liquid fuel of different octane rating and the like.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a vertical sectional view of the mixing valve of my invention.

Fig. 2 is a horizontal sectional view at line 2—2 of Fig. 1.

Referring now to the drawings, I provide a casing 2 having an exterior collar 4 to receive the inlet pipe 6. Within the casing I utilize an open cylinder 8 connected through passage 10 with the collar 4. A partition 12 transversely of the cylinder separates the upper and lower portions and within the cylinder and through the partition I provide a spaced inner wall 14 the ends of which are recessed at 15 and 16 to form valve seats.

A central passage 17 through the wall 14 permits communication between the upper and lower parts of the casing. The upper and lower ends of the cylinder 8 are also recessed at 18 and 20 to form valve seats and a passage 22 communicates with the collar 24 and the inlet pipe 26.

A valve 28 has tapered surfaces 30 and 31 for seating with the recesses 18 and 15, and this valve also is provided with a tapered seat 32.

A stem 34 for the valve has a cruciform lower section 36 forming passages 38 within the passage 17 of wall 14 and the cap 40 is secured by ring 42, the partition 43 formed with a seat 44 for the taper 32 of valve 28. Packing 45 seals the cap to the casing.

An outlet collar 46 receives pipe 48 and ring 50 secures the valve stem in the cap 40 in slidable relation.

A valve 52 having a tapered seat 54 engaging recess 20 is fashioned with a cruciform stem 56 forming passages 58 and this valve is pressed into seating position by spring 60 seated in recess 62 of cap 64 which confines packing 66 on the casing 2.

As illustrated in Fig. 1 the valve 28 is seated at 44 to close off the outlet pipe 48. By moving the stem 34 and valve 28 downwardly the port

2 through partition 43 is opened permitting the flow from outlet pipe 48.

Further movement of the stem contacts the elements 36 and 56 whereupon the valve 52 is moved to open position against the spring permitting flow from inlet pipe 26 to mix with flow from pipe 6.

Adjustment of the stem will result in variation of the proportions of mixture as may be desired and with the valve 28 seated as shown in dotted lines, the flow will be solely from pipe 26 around the exterior of the cylinder 8.

Having thus fully described my invention what I claim as new and desire to secure by Letters Patent is:

1. In a mixing valve, a casing, an inner open-ended cylinder mounted within the casing, a circular wall within the inner cylinder spaced from the wall of the cylinder providing a vertical passageway with the wall of the cylinder, said circular wall providing a valve stem guide, a horizontal partition within the cylinder dividing the space within the cylinder into upper and lower open-ended chambers, adapted to discharge a fluid into the casing, inlet pipes connecting with the upper and lower chambers, the open ends of the chambers being beveled providing valve seats, a casing cap, a partition within the casing cap formed with an opening having a beveled wall providing a valve seat, a double valve member movable within the casing adapted to either seat against the partition of the cap or against the seat at the upper end of the cylinder, a normally closed valve at the open lower end of the cylinder, having a valve stem movable with the valve stem guide, and said valve stem of the valves cooperating in simultaneously operating the valves to discharge a mixed fluid therefrom.

2. In a mixing valve, a casing, an inner cylinder spaced from the casing wall, a circular wall within the inner cylinder and being spaced therefrom, a horizontal partition dividing the space between the inner cylinder and circular wall into upper and lower circular passageways communicating with inlet pipes, said inner cylinder and circular wall having beveled ends providing upper and lower valve seats, a spring-pressed valve normally seating against the lower valve seat, a valve stem movable through the circular wall and forming a part of the spring-pressed valve guiding the valve in its vertical movements, a control valve operating within the housing adapted to seat at the upper end of the inner cylinder and circular wall, a cap having a partition formed with a valve seat, and said control valve adapted to seat against the valve seat in the cap simultaneously opening the upper end of the inner cylinder and an outlet pipe extending from the cap.

ROBERT SIMPSON.

REFERENCES CITED

The following references are of record in the file of this patent:

UNITED STATES PATENTS

| Number | Name | Date |
|---|---|---|
| 221,506 | Blessing | Nov. 11, 1879 |
| 949,869 | White | Feb. 22, 1910 |
| 995,642 | Watrous | June 20, 1911 |
| 1,732,097 | Lemetais | Oct. 15, 1929 |

FOREIGN PATENTS

| Number | Country | Date |
|---|---|---|
| 58,014 | Austria | Mar. 10, 1913 |
| 678,540 | France | Dec. 24, 1929 |